(12) United States Patent
Jepsen

(10) Patent No.: US 6,366,581 B1
(45) Date of Patent: *Apr. 2, 2002

(54) METHOD AND APPARATUS FOR GENERATING PERMANENT VIRTUAL CONNECTIONS USING GRAPHICAL USER INTERFACE

(75) Inventor: Thomas C. Jepsen, Chapel Hill, NC (US)

(73) Assignee: Fujitsu Network Communications, Inc., Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,776

(22) Filed: Apr. 2, 1997

(51) Int. Cl.[7] .............................................. H04L 12/24
(52) U.S. Cl. ...................................................... 370/397
(58) Field of Search ................................ 370/409, 384, 370/397, 399; 379/93.23, 93.21, 111; 709/223, 235, 224, 225; 345/734, 735, 736, 771, 825, 826

(56) References Cited

U.S. PATENT DOCUMENTS

| | | | | |
|---|---|---|---|---|
| 4,456,788 A | * | 6/1984 | Kline et al. | 379/137 |
| 5,280,576 A | * | 1/1994 | Kojima et al. | 370/397 |
| 5,282,203 A | * | 1/1994 | Oouchi | 370/232 |
| 5,307,456 A | * | 4/1994 | MacKay | 345/328 |
| 5,335,320 A | | 8/1994 | Iwata et al. | |
| 5,339,430 A | | 8/1994 | Lundlin et al. | |

(List continued on next page.)

OTHER PUBLICATIONS

Fairhurst et al. "A graphical Tool for Visualizing Performance of a X.25 Packetized Communication Line"; Teletraffic Symposium, 8th. IEE Eight UK; pp. 10/1–10/5, 1991.*

Bochmann et al. "Architectural design of adaptive distributed multimedia systems"; Multimedia Software Development, 1996. Proceedings., International Workshop; pp. 31–40, Mar. 1996.*

*FETEX–150 ESP Broadband Switching System Translations Guide* Doc. No. ES18X–1516–G72, Apr. 1996.

*FETEX–150 ESP Broadband Switching System Command Handbook*, Doc. No. ES18X–1511–H72, Jun. 1996.

Primary Examiner—Chau Nguyen
Assistant Examiner—Jasper Kwoh
(74) Attorney, Agent, or Firm—Baker Botts L.L.P.

(57) ABSTRACT

Using a graphical user interface, the user is requested to enter a type of permanent virtual connection desired to be created. Based on the type of permanent virtual connection desired to be created, it is determined what data is necessary to generate the permanent virtual connection. Using a graphical user interface, the user is requested to enter the data determined to be necessary. When the user is requested to enter a type of permanent virtual connection desired to be created, information is requested from the user as to whether a point-to-point connection or a point-to-multipoint connection is desired, as to whether a virtual path connection or a virtual channel connection is desired, as to a desired quality of service, as to how billing data is to be collected, and as to a type of traffic to be handled by the permanent virtual connection. The data is assembled in a form recognizable by a telecommunications switch. The data is partially assembled in a form recognizable by a telecommunications switch and displayed as the user is requested to enter data. The form recognizable by a telecommunications switch has positional parameters recognized by the telecommunications switch based on position and key word parameters recognizable by the telecommunications switch based on an arrangement of characters. Both the positional parameters and the key word parameters are ordered in a predetermined order.

20 Claims, 10 Drawing Sheets

U.S. PATENT DOCUMENTS

| | | |
|---|---|---|
| 5,369,765 A | 11/1994 | Collet |
| 5,377,318 A | 12/1994 | Wolber |
| 5,381,548 A | 1/1995 | Matsuo |
| 5,388,258 A * | 2/1995 | Larsson et al. ............. 707/104 |
| 5,485,615 A | 1/1996 | Wennmyr |
| 5,488,569 A | 1/1996 | Kaplan et al. |
| 5,551,041 A | 8/1996 | Beethe |
| 5,557,730 A | 9/1996 | Frid-Nielsen |
| 5,592,603 A | 1/1997 | Arato et al. |
| 5,699,347 A * | 12/1997 | Callon ....................... 370/238 |
| 5,705,436 A * | 1/1998 | Lewis et al. ................ 709/235 |
| 5,715,394 A * | 2/1998 | Jabs ........................... 709/223 |
| 5,717,748 A * | 2/1998 | Sneed, Jr. et al. .......... 395/111 |
| 5,726,979 A | 3/1998 | Henderson et al. ......... 370/254 |
| 5,757,784 A * | 5/1998 | Liebowitz et al. .......... 370/321 |
| 5,761,432 A | 6/1998 | Bergholm et al. ..... 395/200.56 |
| 5,793,976 A * | 8/1998 | Chen et al. .................. 709/224 |
| 5,809,265 A * | 9/1998 | Blair et al. .................. 345/339 |
| 5,892,950 A | 4/1999 | Rigori et al. ................ 395/705 |
| 5,953,347 A | 9/1999 | Wong et al. ................ 370/469 |
| 5,974,237 A * | 10/1999 | Shurmer et al. ............ 709/223 |

* cited by examiner

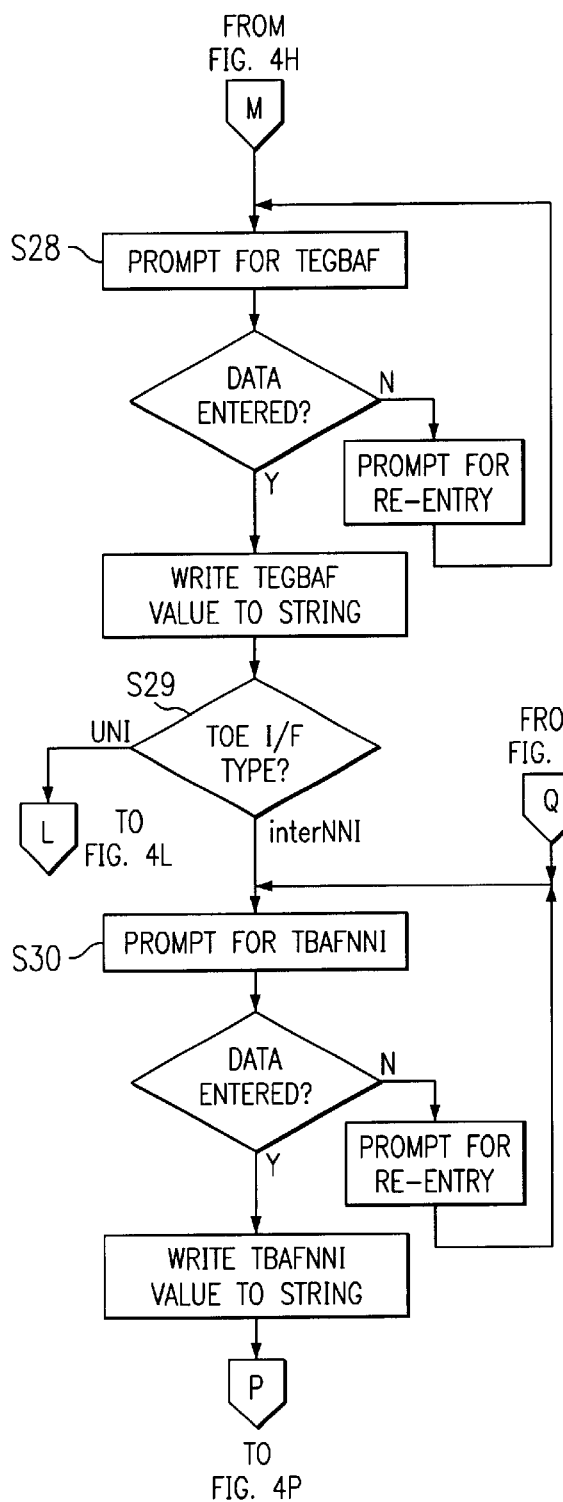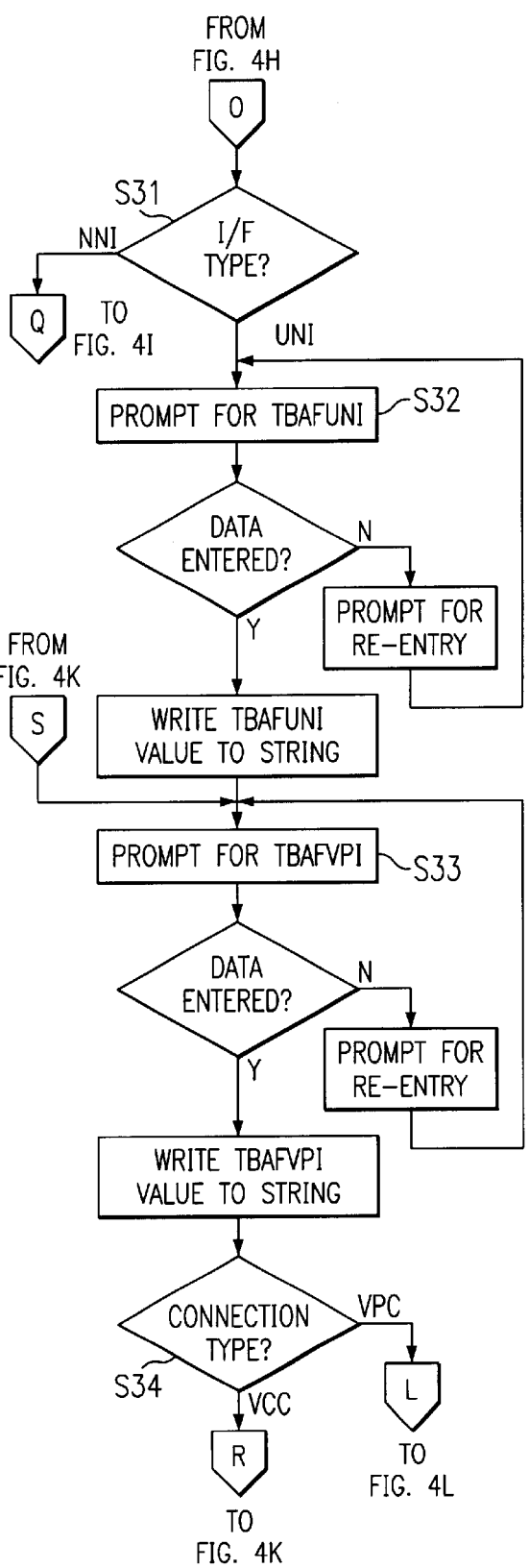
FIG. 4I
FIG. 4J

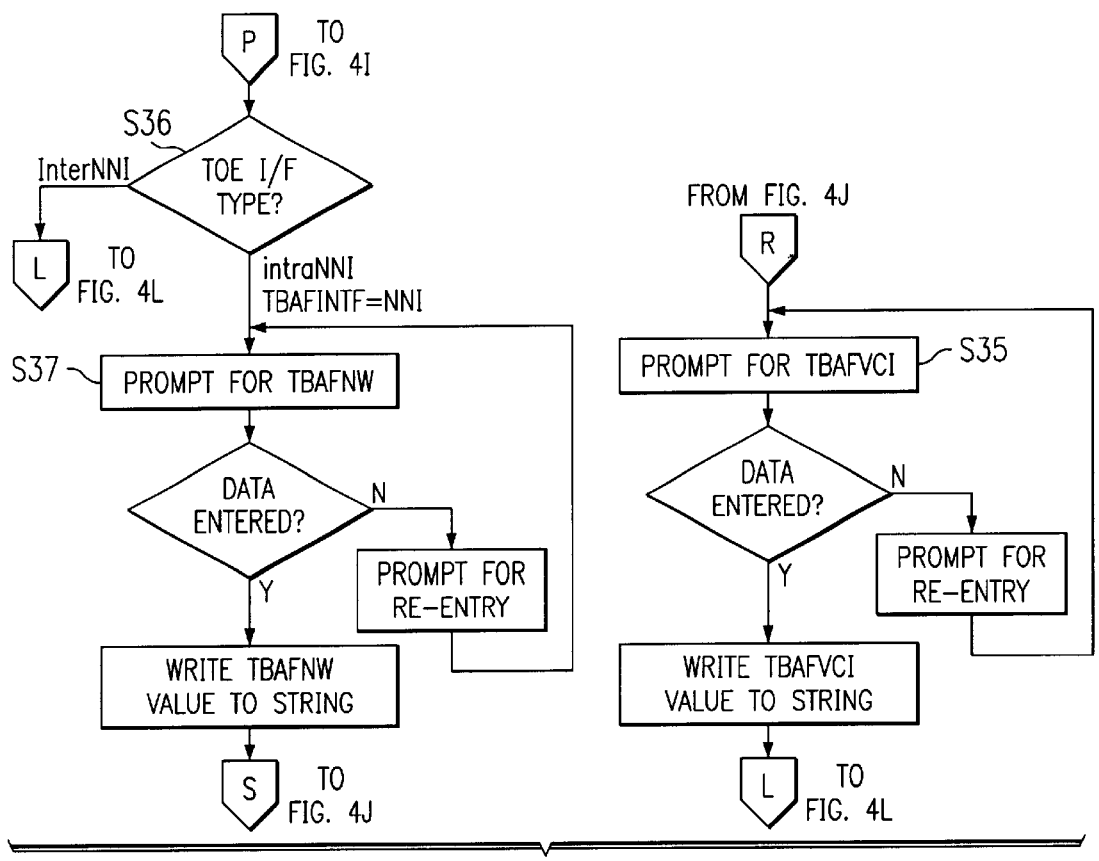
FIG. 4K
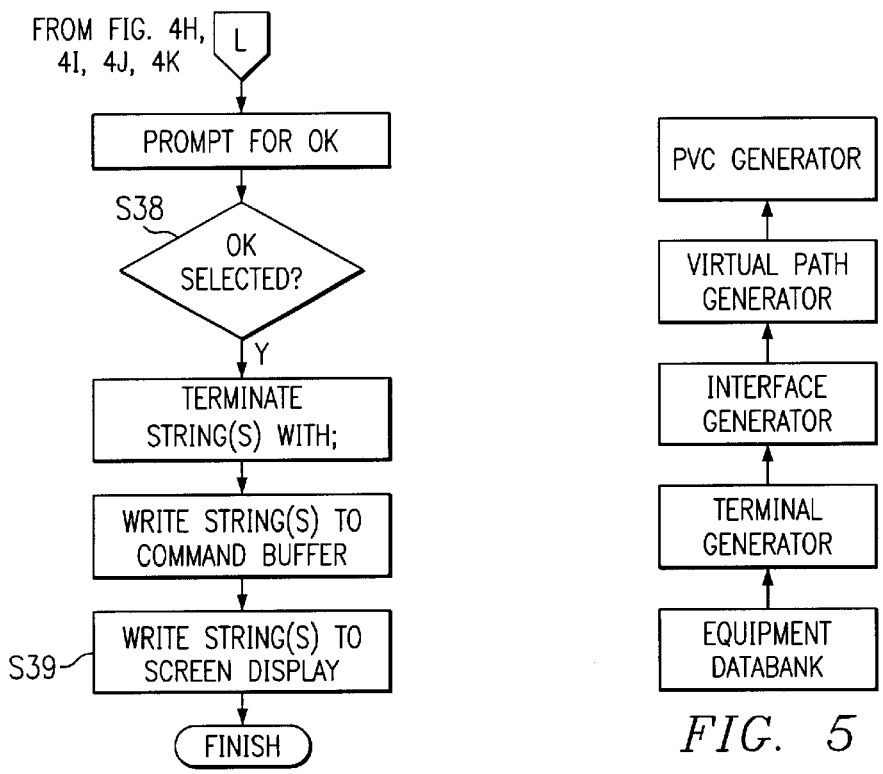
FIG. 4L
FIG. 5

METHOD AND APPARATUS FOR GENERATING PERMANENT VIRTUAL CONNECTIONS USING GRAPHICAL USER INTERFACE

BACKGROUND OF THE INVENTION

1. Field of the Invention

The present invention relates to telecommunication switching equipment in general and more specifically to a method and apparatus for creating a permanent connection from one side of the telecommunications switch to the other side of telecommunications switch.

2. Description of the Related Art

Telecommunication networks are often classified into the type of information transmitted thereon. For example, there are voice, video and data networks. Some telecommunication networks are capable of accommodating different types of data. Broad band switching systems, such as those using asynchronous transfer mode (ATM) packets are an example of systems which may be able to transmit several types of information.

FIG. 1 shows a typical ATM network. In FIG. 1, LEC represents local exchange carrier. Each local exchange carrier includes at least one switch. An example of an ATM switch in a local exchange carrier is the Fujitsu FETEX 150 ESP Broadband Switching System. TE represents terminal equipment. Terminal equipment is the equipment belonging to the customer or user of the network. The circles enclosing multiple local exchange carriers represents different operating companies. IC is an inter-exchange carrier, a carrier which connects one operating company to another operating company. The connections within the network are denoted by the UNI or NNI, depending on what the connection is between. A UNI is a user-network interface, and this indicates that the connection is between a network and a user. NNI represents network node interface, a connection between a switching node and another switch, rather than a user. Of the NNIs, there are two types. An NNI between two switches belonging to the same operating company is referred to as an intraNNI, and an NNI between two switches belonging to different operating companies is referred to as an interNNI. Billing is a main reason why it is important to differentiate between intraNNIs and interNNIs.

A permanent virtual connection is a connection from one side of a switch to the other side of the switch. For example, it is possible that the entity owning terminal equipment A would run connectivity to operating company A so this entity can communicate with the entity owning terminal equipment D. In the switch of local exchange carrier 1, one side of the switch would have the node permanently connected to terminal equipment A. With a permanent virtual connection, this node would be connected to a node on the other side of the local exchange carrier 1 switch, which in turn would be permanently connected to local exchange carrier 3. Although the term "permanent" is used, it is possible that the connection will change dynamically. For example, at some time during the day, one branch of a financial institution may need to transfer back-up data to another branch of the financial institution. In this case, the permanent virtual connection may be established every business day, at a particular time of the day. Perhaps at a different time of the day different users would use the same connection.

A permanent virtual connection can be compared to a "nailed-up" connection in conventional telephone equipment. In a nailed-up connection, two parties who need to communicate often, can avoid per-call toll charges. In this case, every time the dedicated telephone equipment is used, the only user who can be reached is the other party. On the other hand, a permanent virtual connection and a nailed-up connection can both be contrasted with a "switched virtual connection," which is comparable to the standard dialed-in connection used in conventional telephone equipment. In a switched virtual connection, the telephone user decides who to call every time the telephone is picked up. The parameters which determine routing and connections from one side of a switch to the other side of the switch are determined separately for every call, based on the number dialed by the user.

There are at least two ways to establish a permanent virtual connection between two sides of a switch. First, the permanent virtual connection can be established remotely at a central location within the operating company. Second, the permanent virtual connection can be done on-site at the local exchange carrier. On-site permanent virtual connections are done, for example, when performing maintenance on a switch or testing a new route.

For both the centralized approach and the on-location approach, establishing a permanent virtual connection in the past has been a very laborious two-step procedure performed by highly trained workers. The first step is usually performed by a translations engineer who consults manuals, her education and experience. The translations engineer would assess the needs of the permanent virtual connection and determine how the network can satisfy those needs. The second step involves incorporating the translations engineer's decisions into a connection. The second step is usually performed by a technician (a person different than the translations engineer). The second step is performed at the switch (local exchange carrier) or at a central location for the operating company. The technician who performs the second step must understand, based on the connection outlined by the translations engineer, what information the switch will need. Further, the technician who performs, the second step must know how to provide this information to the switch. For example, the switch may require certain of the information to be provided in a specified order.

In the second step, the switch is controlled using a language called Transaction Language 1. Transaction Language 1 (TL1) is a language developed specifically for controlling telecommunications equipment and uses ASCII characters. TL1 standards are described in BellCore References TA-NWT-000199, TA-NWT-000831 and TA-NWT-000833. TL1 was designed to have abbreviated commands which represent the words for which they stand. For example, the word route is represented by "RT". TL1 is difficult to understand, and other, newer languages have been proposed, such as a language known by the acronym CMISE (common management information service elements). CMIP (common management information protocol) is the protocol to implement CMISE. Although newer languages are proposed, the more difficult TL1 language is still being used. Should the protocol ever change from TL1, the change will clearly make the second more difficult, at least in the short term.

The syntax and structure of a TL1 command is as follows:

>VERB-NOUN:AID:P1-Pxx;

In the above, > is a command prompt, VERB-NOUN represents a command code, AID is an access identifier, P1-Pxx is the parameter block, and; (semicolon) is a command terminator. An example of a TL1 control command for assigning a route to telephone calls which need to go to the city of Morgantown, is as follows:

>ENT-RT:RTN=0001:OFLOCN-VPCI=MORGANTOWN-1,
TEST=Y;

In the above, after the prompt >, ENT-RT: is the command code. It includes a verb (ENT for "enter") and a direct object (RT for "route") separated by a hyphen. The command code ends with a colon. RTN=0001: is the access identifier. For identification within the switch, the access identifier gives a name and a number to the command. The access identifier also ends in a colon. In the above, "OFLOCN-VPCI=MORGANTOWN-1,TEST=Y" is the parameter block and includes the parameters describing the connection. Each parameter includes a parameter name (for example OFLOCN-VPCI for the virtual path connection identifier at the office location) and a parameter value (for example MORGANTOWN-1 for a VPCI of 1 and an office location of Morgantown). The parameter name and the parameter value are connected with an equal sign. Note that the hyphens show the correlation between the two parts of the parameter name and the two parts of the parameter value. Commas are used to string together parameters. Finally, the command includes a semicolon indicating that the command is complete and ready for execution.

SUMMARY OF THE INVENTION

It is an object of the present invention to simplify the process of creating a permanent virtual connection.

It is a further object of the present invention to provide a method and apparatus for creating a permanent connection which requires less knowledge about the TL1 language.

It is a yet further object of the present invention to enable permanent virtual connections to be created as a one-step process.

It is a still further object of the present invention to automatically determine, based on some input, what information is necessary and how that information must be assembled to establish a permanent virtual connection.

These and other objects are accomplished with a method and apparatus for generating permanent virtual connections in which using a graphical user interface, the user is requested to enter a type of permanent virtual connection desired to be created. Based on the type of permanent virtual connection desired to be created, it is determined what data is necessary to generate the permanent virtual connection. Using a graphical user interface, the user is requested to enter the data determined to be necessary. When the user is requested to enter a type of permanent virtual connection desired to be created, information is requested from the user as to whether a point-to-point connection or a point-to-multipoint connection is desired, as to whether a virtual path connection or a virtual channel connection is desired, as to a desired quality of service, as to how billing data is to be collected, and as to a type of traffic to be handled by the permanent virtual connection. The data is assembled in a form recognizable by a telecommunications switch. The data is partially assembled in a form recognizable by a telecommunications switch and displayed as the user is requested to enter data. The form recognizable by a telecommunications switch has positional parameters recognized by the telecommunications switch based on position and key word parameters recognizable by the telecommunications switch based on an arrangement of characters. Both the positional parameters and the key word parameters are ordered in a predetermined order.

BRIEF DESCRIPTION OF THE DRAWINGS

The invention will now be described in more detail in connection with the attached drawings wherein:

FIGS. 4(A)–4(L) are a flowchart showing how the invention decides based on previous input, which optional parameters are selected to create a permanent virtual connection; and FIG. 5 is a diagram showing the invention used with other devices in a stacked configuration.

DETAILED DESCRIPTION OF THE PREFERRED EMBODIMENTS

Figure 1:
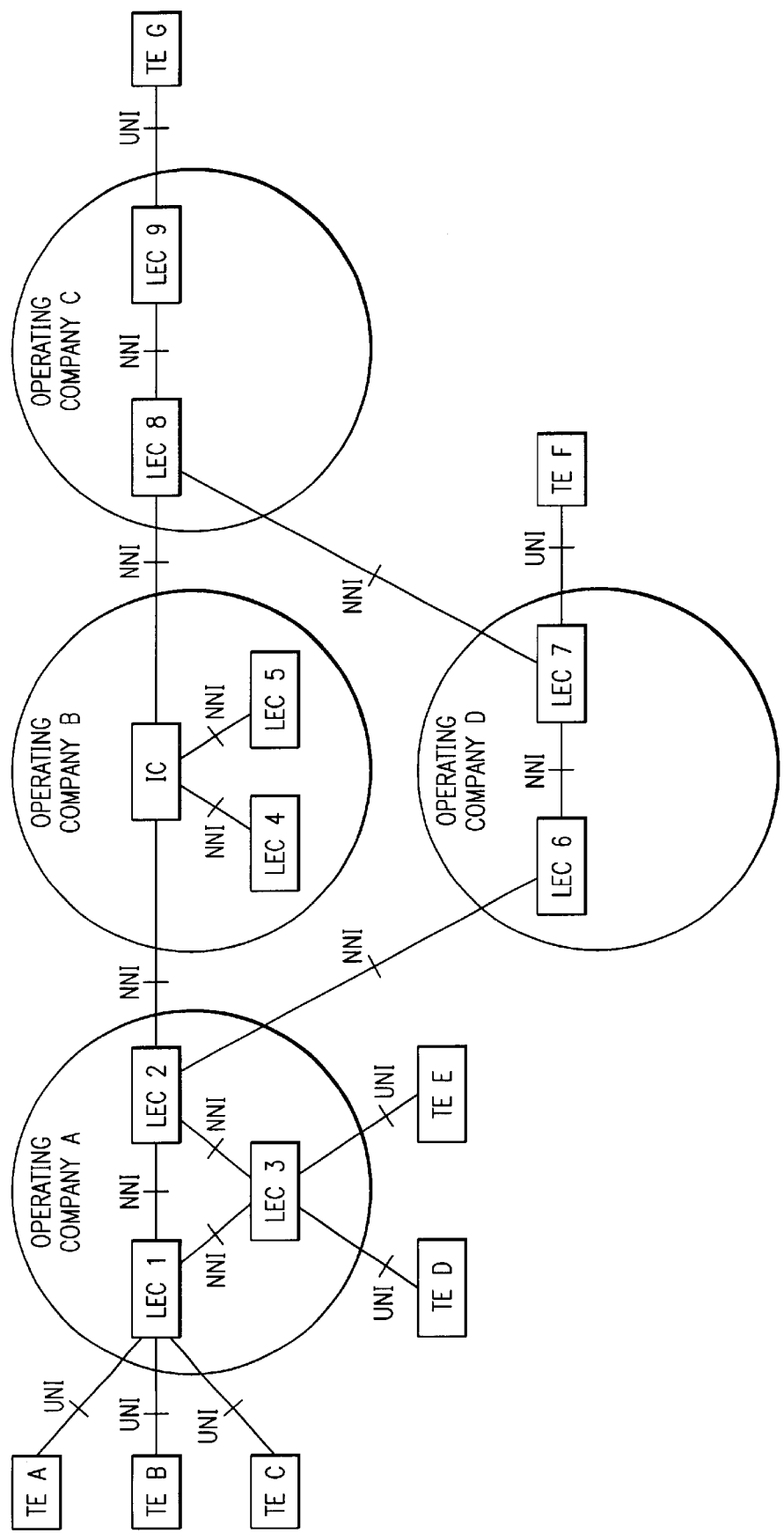
FIG. 1 is a diagram of a conventional ATM network.
Figure 2:
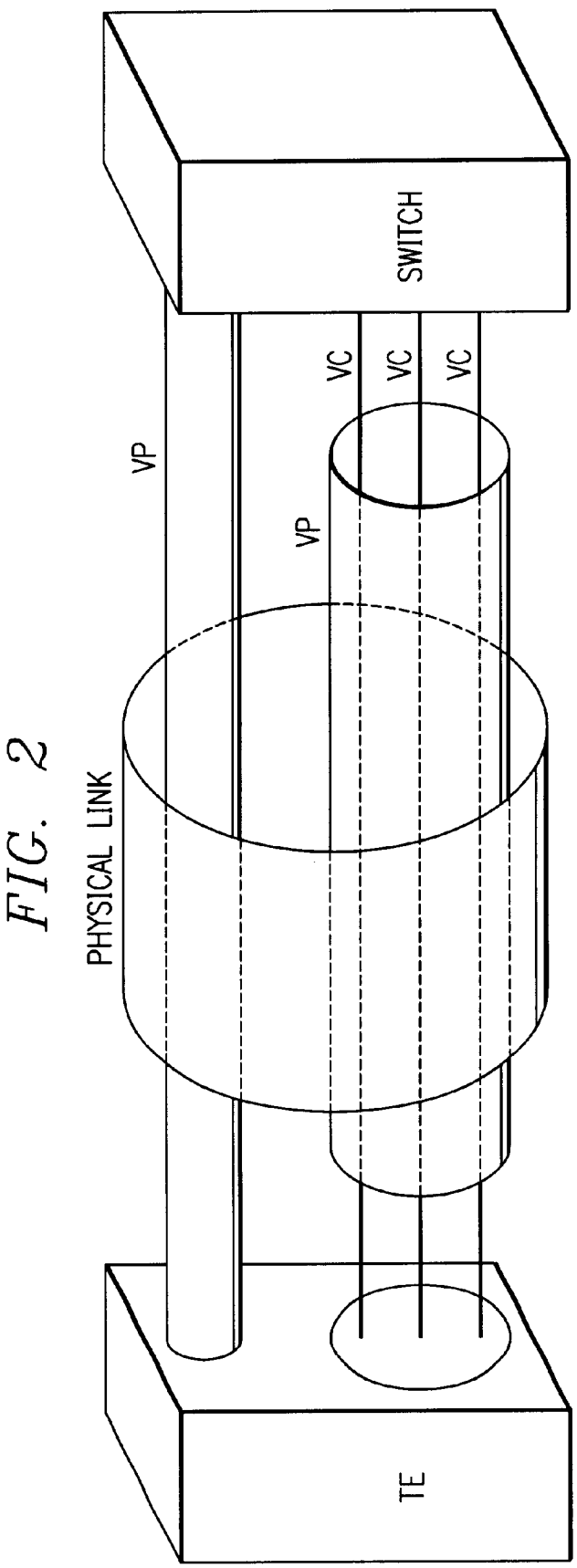
FIG. 2 is a diagram showing a physical link between two portions of the network shown in FIG. 1.

FIG. 2 is a diagram showing a physical link between two portions of the network shown in FIG. 1. The physical link may connect terminal equipment TE with the switch of a local exchange carrier. In this case, the physical link would be a user-to-network interface (UNI). As can be seen from FIG. 2, the physical link is made-up of numerous virtual paths. Within each virtual path, there may be multiple virtual channels. For example, within one virtual path between the same two points, there may be a video conferencing channel, a data transfer channel and a voice channel. The virtual path will have a bandwidth and each virtual channel within that virtual path will use a portion of the bandwidth. All virtual channels must be assigned to a virtual path. However, it is not necessary for each virtual path to have virtual channels specified therein.

The present invention can create a point-to-point connection. In this case, two physical links may be connected. The two physical links are connected through a switch by connecting the node of a first physical link on one side of a switch to a node of the second physical link on the other side of the switch. Alternatively, the present invention may establish a point-to-multipoint connection. In this case, the node on one side of a switch is connected to multiple nodes on the other side of the switch. For point-to-point connection and the point-to-multipoint connection, it is possible to specify the virtual paths at both sides of the switch (for the physical links at which the connection terminates) or the virtual paths and virtual channels at both sides of the switch.

Figure 3:
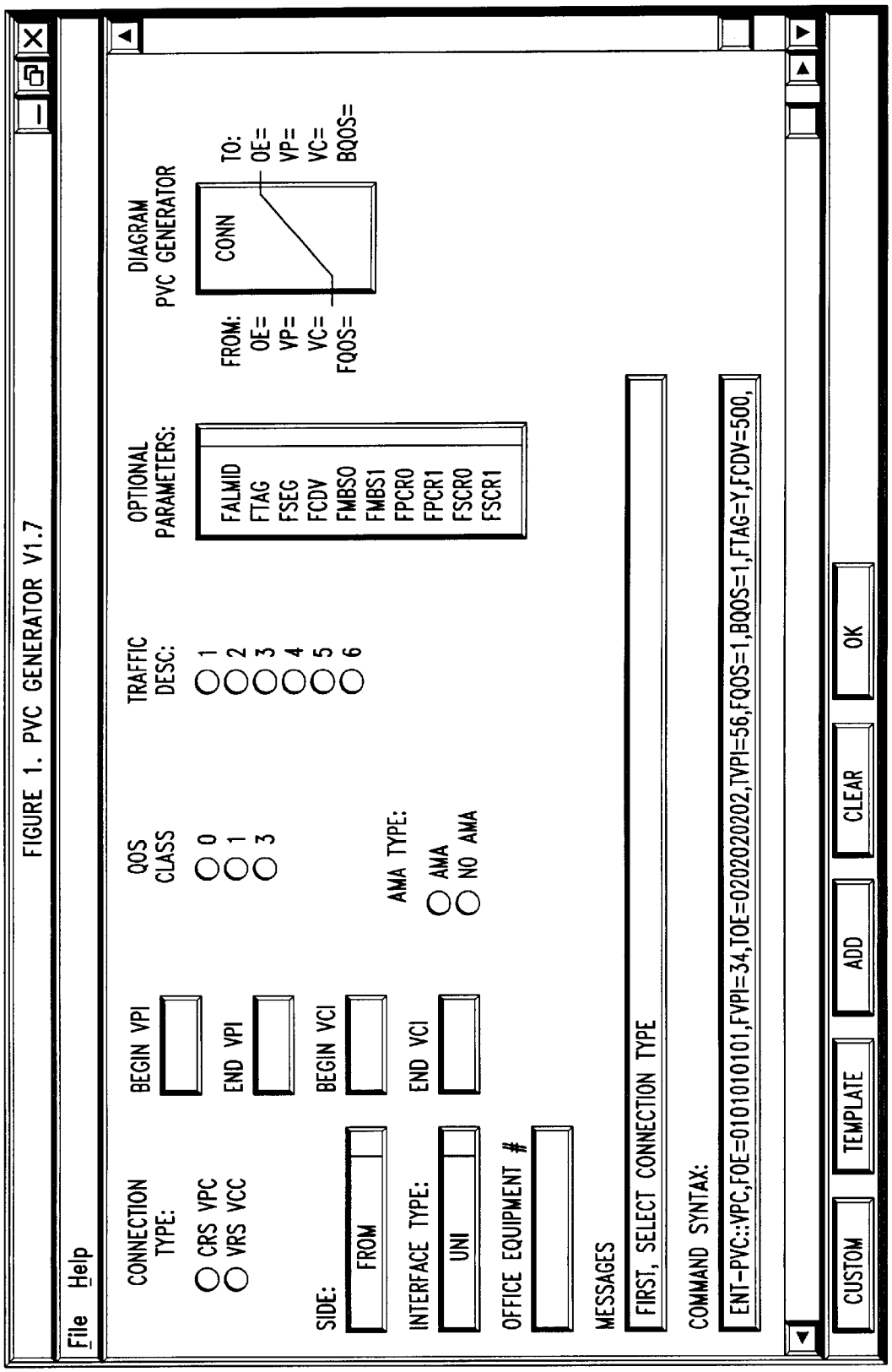
FIG. 3 is a diagram showing a graphical user interface implementing the present invention.

FIG. 3 shows a graphical user interface implementing the present invention. A graphical user interface is an interface where more than one field is simultaneously displayed on a screen, at a distinct position of the screen. The interface shown in FIG. 3 requests various parameters, and, with these parameters, the method and apparatus creates the virtual connection. The field shown in the bottom right of FIG. 3 is denoted as "Optional Parameters." The other parameter fields (Connection Type, Side, Interface Type, Office Equipment Number, Begin and End VPI, Begin and End VCI, QOS Class, AMA Type and Traffic Desc) to be described in detail later, are necessary for all virtual connections. The invention reviews the parameters input in the other parameter fields and determines which optional parameters are necessary. Thus, some optional parameters are required for some virtual connections. The user is asked for the optional parameters in the Optional Parameter field. How the invention determines which optional parameters are necessary will be described later.

The parameters to create a permanent virtual connection have meanings and are obtained by the invention, as described below:

Connection Type: In this field, the user is requested to input an indication regarding which of the possible connection types is being created. There are four possible connection types, point-to-point virtual path (the virtual channel is not also being specified), point-to-point virtual channel (both virtual path and virtual channel specified), point-to-multipoint virtual path and point-to-multipoint virtual channel. The two fields shown in FIG. 3 are cell relay service (CRS) for virtual path connection (VPC) and CRS virtual channel connection (VCC).

Side: In this field, the user specifies the connection side ("From" or "To") for which subsequently entered parameters will be effective. Referring to FIG. 1, the "from" side of a switch may be either a UNI or a NNI, depending on the point of view of the person setting up the connection; the "to" side of the switch may also be either a UNI or a NNI, again depending on the point of view of the person setting up the connection. Referring to FIG. 1, one side of the switch may be a user-network interface and another side of the switch may be a network-node interface. Which side is considered to be the From side and which side is considered to be the To side is relative to the point of view of the operator and may be reversed. That is, it does not matter which side is considered to be the From side and which side is considered to be the To side. However, once a side is labeled as the From side, that labelling must be used for subsequent entry of parameters. To avoid confusion, the invention requires the operator to enter the From side parameters before entering To side parameters.

Office Equipment Number: This field allows the user to enter a ten-digit number denoting the physical piece of interface hardware which will handle the connection at the From and To sides. That is, an Office Equipment Number is input separately for the From side and for the To sides. The first six digits of the Office Equipment Number represent the frame number. More specifically, the first and second digits represent the floor of the building on which the switch sits, the third and fourth digits represent the row in which the switch sits if there are multiple rows of switches, and the fifth and sixth digits represent the frame of switch, in that row. Each frame has multiple shelves. The seventh digit represents the shelf holding the card, within the frame. The eighth and ninth digits represent the unit number on the shelf. The unit number identifies the position of the card. The tenth digit represents the card number. However, because the card may be uniquely identified with the first nine digits, the tenth digit may simply be set to zero.

Begin/End Virtual Path Identifier (VPI) and Virtual Channel Identifier (VCI): The virtual path and virtual channel concepts are described above with reference to FIG. 2. The virtual path identifier and virtual channel identifier are assigned respectively to the virtual path and virtual channel for the purpose of identification. Valid VPI values are 0–255 for UNI interfaces and 0–4095 for NNI interfaces, and the invention checks the values entered for validity. The "Begin" value allows the user to enter either the identification number for a first connection (if more than one connection is being created simultaneously) or the identification number for a single connection if only one connection is being created. The "End" values are used only if multiple connections are being established simultaneously. For example, if one wanted to simultaneously establish ten virtual path connections for a UNI interface, the Begin VPI may be 191 and the End VPI may be 200. When Begin and End values are selected for the From side (which is selected first), a range is determined so that the end value for the To side need not be input, and is simply calculated based on the range.

Specifically with regard to the Begin/End VCI, this field is not used when the user is generating a virtual path connection. Valid VCI values are 32–4093, and as with the Begin/End VPI, the invention checks entered values for validity.

Quality of Service (QOS) Class: The QOS Class field requests the user to input information regarding the bit rate of traffic travelling through the connection. QOS Class 0 indicates that the traffic has an unspecified bit rate. QOS Class 1 indicates that the traffic has a constant bit rate, and QOS Class 3 indicates that traffic has a variable bit rate. The same QOS Class is used for traffic travelling in both a forward direction and a backward direction through the node.

Custom and Template: After selecting the QOS Class, the invention asks the user to enter either Custom or Template by operating the appropriate function button. With the Custom option, the user can create customized virtual connections and use any or all optional parameters. However, with the Custom option, many of the advantages provided by the present invention are lost, and the user must have detailed knowledge of each parameter, its functions and interrelationship with other parameters. Further, with the Custom option, only a single PVC can be generated at a time. That is, the user cannot specify an End VPI or an End VCI to create multiple connections at once.

To achieve the full benefit of the present invention, the user would likely select the Template option, and most of the discussion herein presumes selection of the Template option. When the Template option is selected, there are several parameters which the user cannot set, although these parameters would be available with the Custom option. The following is a list of unavailable Template parameters:

Unavailable Parameters

Segment Endpoint (SEG): This parameter is used to denote whether a UNI or NNI can support loopback testing for diagnostic purposes. This parameter relates to the new CMIP protocol and CMISE language, mentioned above.

Recovery (RCVRY): This parameter is used to identify a "non-recoverable connection," a connection in which, when there is a loss of service due to a problem in the connection, the switch will not try to re-establish the connection after the problem is cured.

Alarm ID (ALMID): This parameter allows the user to customize the type of warning given in case of connection problems.

Automatic Message Accounting (AMA) Type: Automatic message accounting relates to whether billing data will be collected on a per-connection basis at that node of the network. Referring to FIG. 1, billing data is not collected at interfaces within an operating company. Accordingly, if both the From side and To side represent intraNNIs, all optional parameters related to billing data collection ("AMA Parameters") are not considered. Also, if "No AMA" is entered for the AMA Type, the AMA Parameters are not considered.

If yes is selected for the AMA Type and one of the To and From sides is an interface other than an intraNNI, the invention will request the user to input AMA Parameters from among the following complete list of AMA parameters.

AMA Parameters

Service (SRVCM: The SRVC parameter identifies the service type for which billing data is to be collected. To identify the service type, the user can select from two subparameter options, cell relay service (CRS) and circuit emulation service (CES). Cell relay service is when ATM cells are transferred through the switch in an unmodified format. Circuit emulation service is used when a transmission line terminates at the switch.

Subscriber Line Study (SLS): This parameter is set to monitor a customer's usage. Complaint Observe (COOBS): With this parameter, the source of customer complaints can be observed.

Network Completion (NWCO): This parameter signifies that the connection is leaving an operating company's switching network to another network. A tariff may be imposed at this point.

From Ingress Bell Accounting Format (FINBAF): This parameter, and all parameters having "BAF" in their name, relate to an accounting record which has a format originally established by Bell Telephone. The parameters having an "F" or a "T" in the beginning thereof relate to either the From side or the To side of the switch, and the "F" or the "T" respectively indicate which side. The "IN" and "EG" represent ingress and egress, respectively. The "IN" or "EG" specify whether the parameter relates to traffic going into the switch ("IN") or traffic leaving the switch ("EG"). The setting for FINBAF determines whether or not the BAF record will be generated for traffic entering the From side of the switch.

TINBAF: The setting for TINBAF determines whether or not the BAF record will be generated for traffic entering the To side of the switch.

FEGBAF: The setting for FEGBAF determines whether or not the BAF record will be generated for traffic leaving the From side of the switch.

TEGBAF: The setting for TEGBAF determines whether or not the BAF record will be generated for traffic leaving the To side of the switch.

From-Side Bell Accounting Format INTerFace Type (FBAFINTF): The setting for FBAFINTF determines at what type of interface will the BAF record be generated for the From side. The subparameter values for FBAFINTF are UNI, NNI and CEIWF to identify the type of interface.

TBAFINTF: This parameter is set when the To side is an intraNNI. The setting for TBAFINTF determines at what type of interface will the BAF record be generated.

From BAF User-Network Interface (FBAFUNI): If the BAF record is to be generated at a UNI for the From side intraNNI (per FBAFINTF), this parameter identifies which UNI.

TBAFUNI: if the BAF record is to be generated at a UNI for the To side (per TBAFINTF), this parameter identifies which UNI.

From BAF Network-Node Interface (FBAFNNI): If the BAF record is to be generated at an NNI for the From side (per FBAFINTF), this parameter identifies which NNI.

TBAFNNI: If the BAF record is to be generated at an NNI for the To side (per TBAFINTF), this parameter identifies which NNI.

From BAF Virtual-Path Identifier (FBAFVPI): This parameter provides the virtual path identifier of the interface generating the BAF record (when not generated at the intraNNI of the switch) for the From side of the switch.

TBAFVPI: This parameter provides the virtual path identifier of the interface generating the BAF record for the To side of the switch.

From BAF Virtual-Channel Identifier (FBAFVCI): This parameter provides the virtual channel identifier of the interface generating the BAF record for the From side of the switch. It is used for Virtual Channel Connections' (VCCs) only.

TBAFVCI: This parameter provides the VCI of the interface generating the BAF record for the To side of the switch.

From BAF Network (FBAFNW): If the From side of the switch is an interNNI between two operating companies, this parameter identifies the network of the adjacent operating company.

TBAFNW: If the To side of the switch is an interNNI between two operating companies, this parameter identifies the network of the adjacent operating company.

Which of the above AMA parameters are set depends on other settings for the virtual channel connection. More specifically, which AMA parameters are set depends on the type of interface at the From and To sides. Also, if one of the From and To sides is an intraNNI, which AMA parameters are set also depends on the type of interface where the BAF record is to be generated for that intraNNI. The following is a list showing the correspondence between the connection interfaces and the AMA parameters to be set.

If FOE=UNI and TOE=UNI: Set SRVC, SLS, COOBS, NWCO, FINBAF, FEGBAF, TINBAF, TEGBAF.

If FOE=UNI, TOE=intraNNI and TBAFINTF=UNI: Set SRVC, SLS, COOBS,NWCO, FINBAF, FEGBAF, TBAFINTF, TBAFUNI, TBAFVPI (and TBAFVCI-if VCC).

If FOE=UNI, TOE=intraNNI and TBAFINTF=NNI: Set SRVC, SLS, COOBS, NWCO, FINBAF, FEGBAF, TBAFINTF, TBAFNNI, TBAFNW, TBAFVPI (and TBAFVCI-if VCC).

If FOE=UNI and TOE=interNNI: Set SRVC, SLS, COOBS, NWCO, FINBAF, FEGBAF, TINBAF, TEGBAF, TBAFNNI.

If FOE=intraNNI, FBAFINTF=UNI and TOE=UNI: Set TINBAF, TEGBAF, SRVC, SLS, COOBS, NWCO, FBAFINTF, FBAFUNI, FBAFVPI (and FBAFVCI-if VCC).

If FOE=intraNNI, FBAFINTF=NNI and TOE=UNI: Set TINBAF, TEGBAF, SRVC, SLS, COOBS, NWCO, FBAFINTF, FBAFNNI, FBAFNW, FBAFVPI (and FBAFVCI-if VCC)

If FOE=intraNNI, FBAFINTF=CEIWF and TOE=UNI: N/A

If FOE=intraNNI and TOE=intraNNI: Set no parameters

If FOE=INTERNNI and TOE=UNI: Set SRVC, SLS, COOBS, NWCO, FINBAF, FEGBAF, TINBAF, TEGBAF, FBAFNNI.

If FOE=interNNI, TOE=intraNNI and TBAFINTF=UNI: Set SRVC, SLS, COOBS, NWCO, FEGBAF, FINBAF, FBAFNNI, TBAFINTF, TBAFUNI, TBAFVPI (and TBAFVCI-if VCC).

If FOE=interNNI, TOE=intraNNI and TBAFINTF=NNI: Set SRVC, SLS, COOBS, NWCO, FINBAF, FEGBAF, FBAFNNI, TBAFINTF, TBAFNNI, TBAFVPI, (TBAFVCI-if VCC), TBAFNW.

If FOE=interNNI, TOE=intraNNI and TBAFINTF= CEIWF: N/A

If FOE=interNNI and TOE=interNNI: Set SRVC, SLS, COOBS, NWCO, FINBAF, FEGBAF, FBAFNNI, TINBAF, TEGBAF, TBAFNNI.

Traffic Descriptors (DESC): In this field, the user is requested to enter one of six possible traffic descriptors. Which of the six traffic descriptors is selected determines which parameters are necessary to control traffic. These parameters are referred to as "traffic parameters". After a traffic descriptor is selected, the user is prompted to set the appropriate traffic parameters. The appropriate traffic parameters are selected from the following list.

Traffic Parameters

Peak Cell Rate of High Priority Cells (PCR0): In this parameter and other parameters, "0" represents high priority cell. In contrast, "1" (used in other traffic parameters) represents low priority cells. As the name conveys, PCR0 is the maximum rate at which the user will transmit (or receive) high priority cells. Note that there are actually two PCR0 parameters, one for forward moving traffic (FPCR0) and one for backward moving traffic (BPCR0).

Peak Cell Rate of Low Priority Cells (PCR1): This parameter, and all parameters relating to low priority cells, are only relevant if the user differentiates between high priority cells and low priority cells. PCR1 is the maximum rate at which the user will transmit (or receive) low priority cells. As with PCR0, there are actually two parameters, one for forward moving traffic (FPCR0) and one for backward moving traffic (BPCR1).

Sustained Cell Rate of High Priority Cells (SCR0): SCR0 is the expected average rate of high priority cells over time. There are actually two SCR0 parameters, FSCR0 and BSCR0.

Sustained Cell Rate of Low Priority Cells (SCR1): Assuming the user will designate both high and low priority cells, SCR1 is the expected average rate of low priority cells over time. There are actually two SCR1 parameters, FSCR1 and BSCR1.

Maximum Burst Size for the High Priority Cells (MBS0): MBS0 determines the maximum number of high priority cells which can be sent at the peak cell rate of high priority cells (PCR0). Over time, the average cell rate must be less than or equal to SCR0. MBS0 actually includes two parameters, FMBS0 and BMBS0.

Maximum Burst Size for Low Priority Cells (MBS1): MBS1 is the maximum number of low priority cells which can be sent at PCR1. MBS1 actually includes two parameters, FMBS1 and BMBS1.

TAG: The TAG parameter determines what happens to high priority cells which exceed the bandwidth. More specifically, the TAG parameter indicates whether to discard the high priority cells exceeding the bandwidth or whether to mark the excessive high priority cells as low priority cells. There are actually two TAG parameters, FTAG and TTAG. It should be noted that the invention can review the available bandwidth for specific piece of switching equipment and determine if there is sufficient bandwidth to support additional connections.

Cell Delay Variation (CDV): The CDV parameter indicates how much variation in delay the user can tolerate. There are actually two parameters, FCDV and BCDV.

The invention determines which of the traffic parameters are appropriate depending on which of the six traffic descriptors is selected. Which of the six traffic descriptors is selected also determines the setting for the FTAG and TTAG parameters. The following list shows how the traffic descriptors affect traffic parameters:

| Traffic Descriptor | Parameters to be Set | Settings for FTAG and TTAG |
| --- | --- | --- |
| 1 | FPCR0, FPCR1, FCDV, BPCR0, BPCR1, BCDV | FTAG =Y, TTAG =Y |
| 2 | FPCR0, FPCR1, FCDV, BPCR0, BPCR1, BCDV | FTAG =N, TTAG =N |
| 3 | FPCR1, FSCR0, FMBS0, FCDV, BPCR1, BSCR0, BMBS0, BCDV | FTAG =Y, TTAG =Y |
| 4 | FPCR1, FSCR0, FMBS0, FCDV, BPCR1, BSCR0, BMBS0, BCDV | FTAG =N, TTAG =N |
| 5 | FPCR1, FCDV, BPCR1, BCDV | FTAG =N, TTAG =N |
| 6 | FPCR1, FSCR1, FMBS1, FCDV BPCR1, BSCR1, BMBS1 | FTAG =N, TTAG =N |

Diagram: Referring to FIG. 3, a diagram is located in the upper right hand corner of the interface. The diagram graphically represents the connection being created by symbolically showing a connection from the From side to the To side. The diagram also lists relevant parameters. As the user enters the listed parameters, the diagram is updated to include the entered information.

Messages: Towards the bottom of FIG. 3, this field provides the user with step-by-step help in generating a PVC. The help provided in the Messages field is context based and is determined based on the information previously entered by the user. The Messages field also provides information on errors, incorrect data entry and invalid parameter values, and tells the user how to recover from these problems.

Command Syntax: The Command Syntax field displays a command string to establish a PVC, as the invention is creating same, based on user input. When the PVC is complete, the final command string is displayed. If multiple PVCs are being created simultaneously (based on ranges for the VPI and/or VCI), the user may scroll through the entire list of commands and view them individually. In the PVC command, there are positional parameters and keyword parameters. The switch identifies the positional parameters based on their position and the keyword parameter is based on the parameter names. The invention positions both the positional parameters and the keyword parameters at fixed places within the command. In this manner, if one were to compare several PVC commands, like parameters would be located above/below each other, even if the parameters are keyword parameters.

At the bottom of FIG. 3 are various function buttons. The Custom and Template function buttons have already been discussed. The "Add" button is used to add optional parameters to a command string and can be used in both the Custom and Template modes. The user is prompted to press "Add" after selecting a parameter and entering the appropriate data in a pop-up window. The "Clear" bottom is used to clear the screen of all user entered data and return the user to an initial state. The "Okay" button is used to complete entry of parameters and display the final PVC command in the Command Syntax field.

FIGS. 4(A)–4(L) are a flowchart showing how the invention reviews the type of connection which the user desires, and from that type of connection determines which optional parameters are necessary. Further, FIGS. 4(A)–4(L) show how the invention obtains the necessary parameters from the users.

FIGS. 4(A)–4(L) show an example when AMA is selected under the AMA Type to thereby indicate automatic message accounting is on. Further, FIGS. 4(A)–4(L) show an example in which traffic descriptor 5 is selected. FIGS. 4(A)–4(K) are thus less useful in showing the selection of the traffic descriptors. However, selection of the AMA parameters is shown in detail.

Figure 4A:
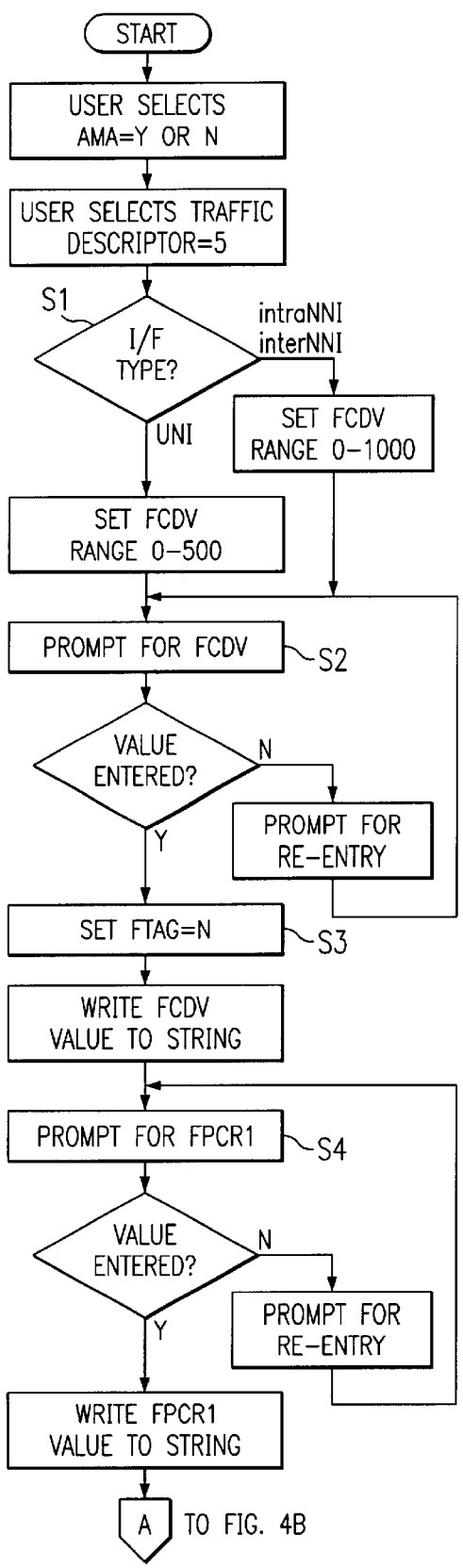

In FIG. 4(A), S1 looks at previously entered data to determine interface type, and S2 requests the user to enter the FCDV parameter. By knowing the interface type, the invention can check to see if the numerical value of FCDV is within an appropriate range. At S3, the FTAG traffic parameter is set to "No". Being that FTAG is a traffic parameter, S3 will vary depending on which traffic descriptor is selected. However, the example of FIGS. 4(A)–4(K) relate to traffic descriptor 5. At S4, the user is prompted to enter the FPCR1 traffic descriptors.

Figure 4B:
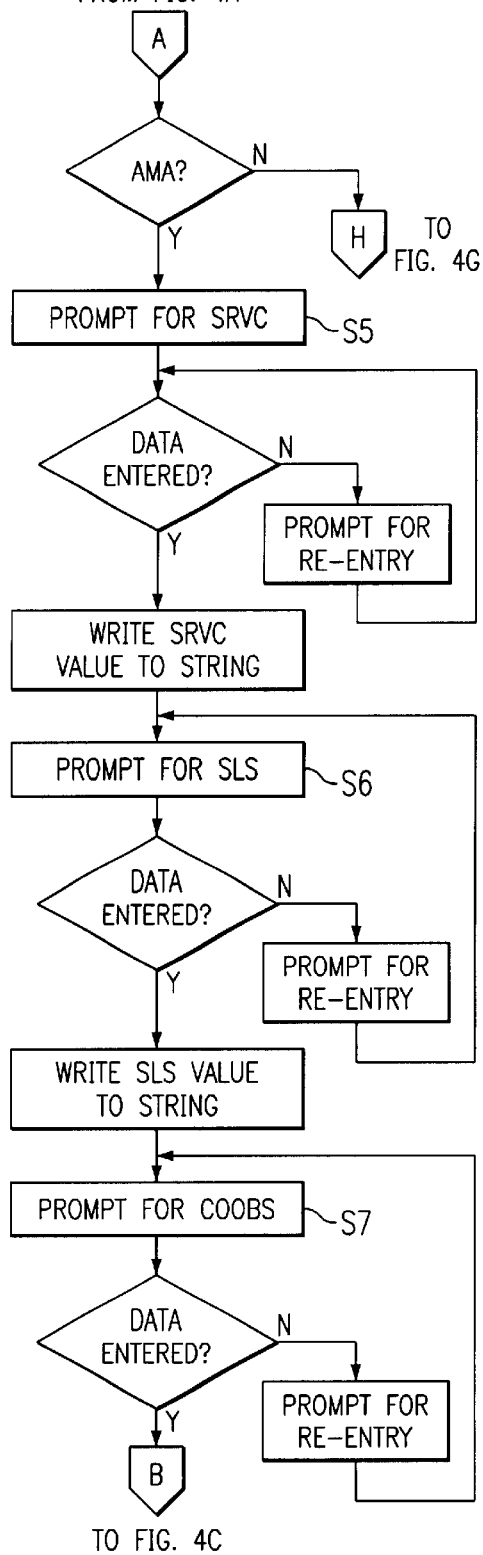

Referring to FIG. 4(B), at S5, the user is prompted to enter the SRVC AMA parameter. At S6, the user is prompted for the SLS AMA parameter, and at S7 the user is prompted for the COOBS AMA parameters.

Figure 4C:
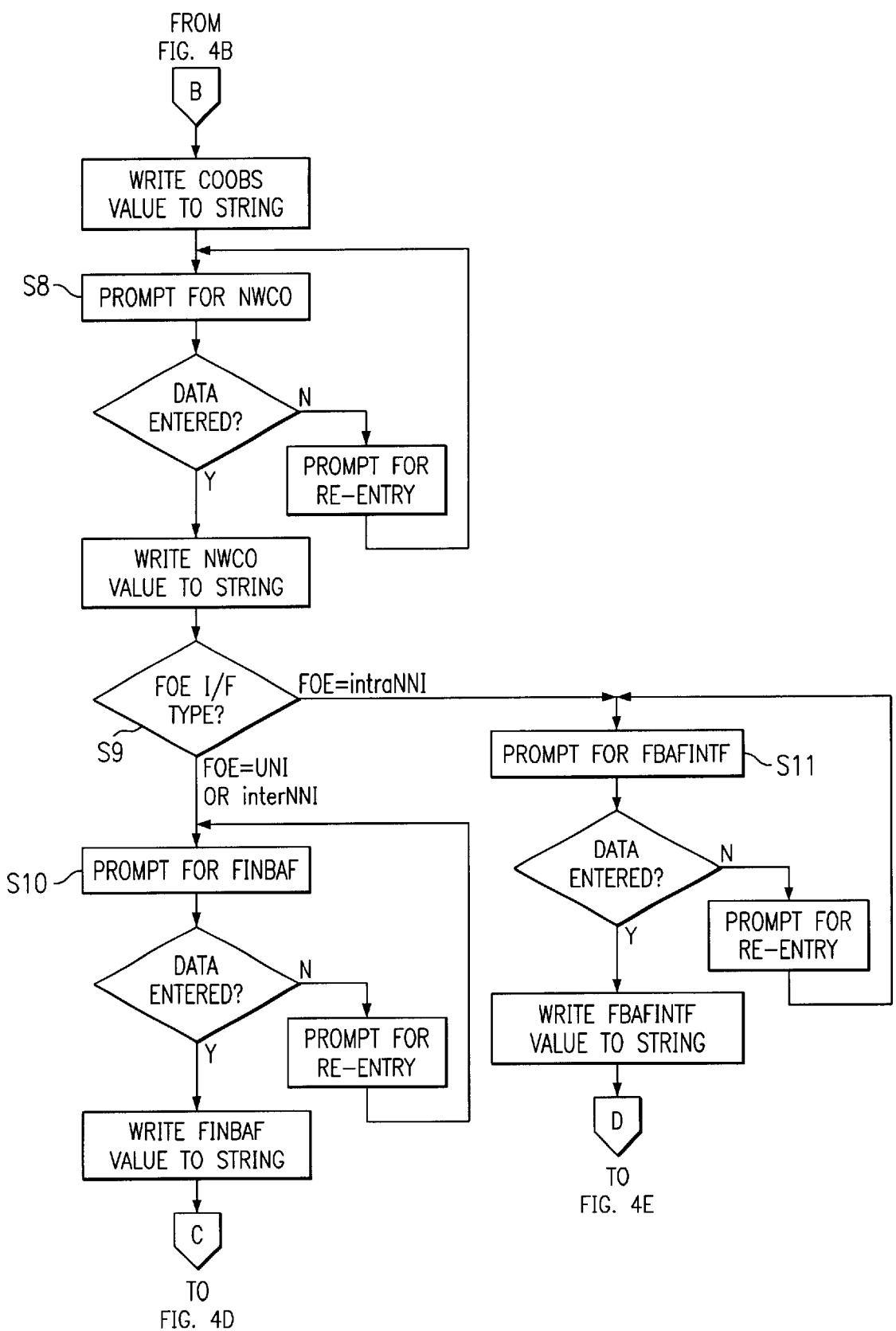

Referring to FIG. 4(C), at S8, the user is prompted for the NWCO AMA parameter. Thus, if the automatic message accounting is selected as being on, the user will always be prompted for the SRVC, SLS, COOBS, and NWCO parameters. Whether the other AMA parameter are requested depends on settings other than just the AMA selection. At S9, the invention determines the type of interface at the From side of the switch based on previously entered data. If FOE is a UNI or interNNI, the user is prompted to enter the FINBAF AMA parameter at S10. If the From side interface is an intraNNI, the user is prompted at S11 to enter the FBAFINTF parameter.

Figure 4D:
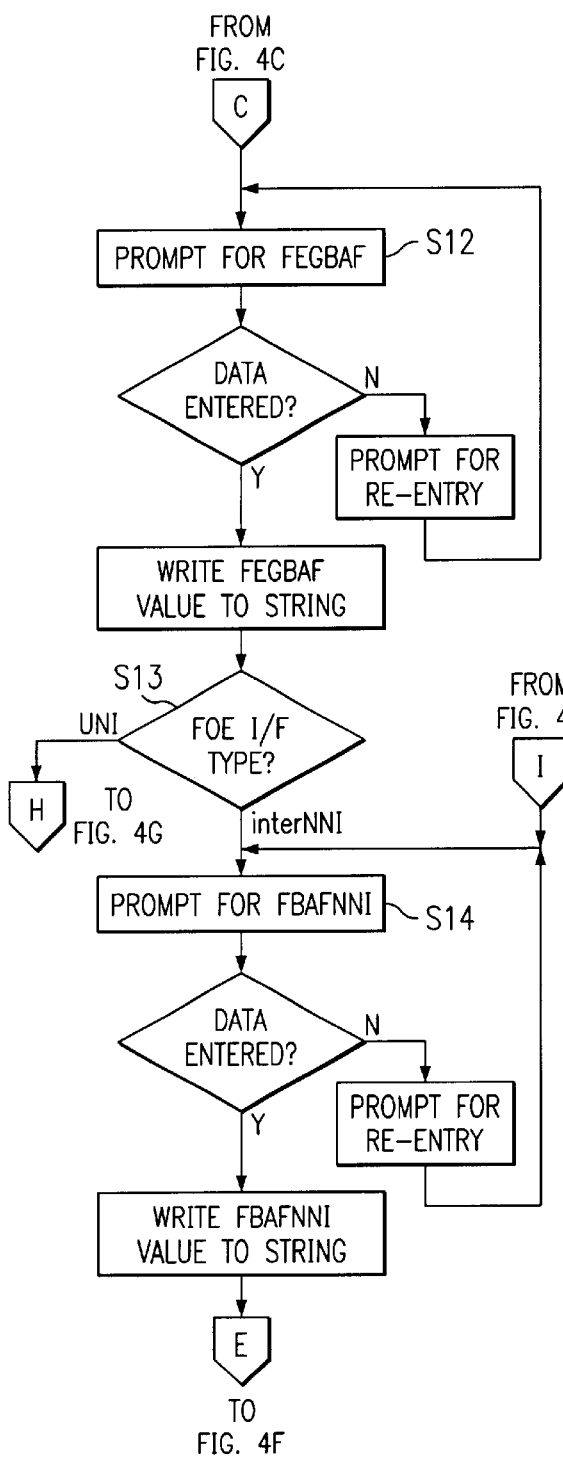

Referring to FIG. 4(D), if FOE=UNI or interNNI, at S12 the user is prompted to enter the FEGBAF parameter. At S13, the invention differentiates between UNI and interNNI FOE's. If FOE=interNNI, the user is prompted to enter FBAFNNI at S14.

Figure 4E:
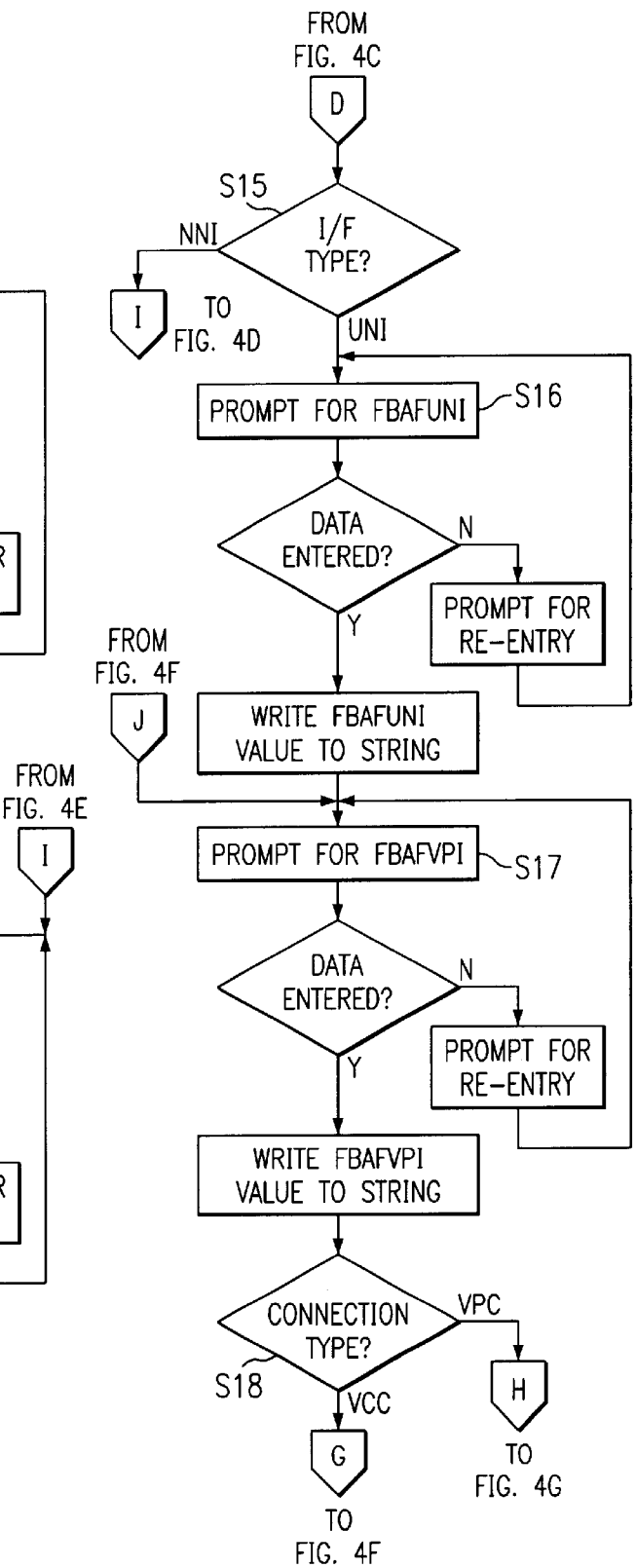

Referring to FIG. 4(E), if S9 determines that FOE=intraNNI, at S15 an inquiry is made to determine the setting for FBAFINTF, the interface type where the BAF record is to be collected. If the setting for FBAFINTF is NNI, the invention proceeds to S14. If the interface type is a UNI, at S16 the user is prompted to enter the FBAFUNI parameter, and at S17, the user is prompted to enter the FBAFVPI parameter. At S18, the invention looks at previously entered data to determine whether the user is creating a virtual path connection or a virtual channel connection.

Figure 4F:
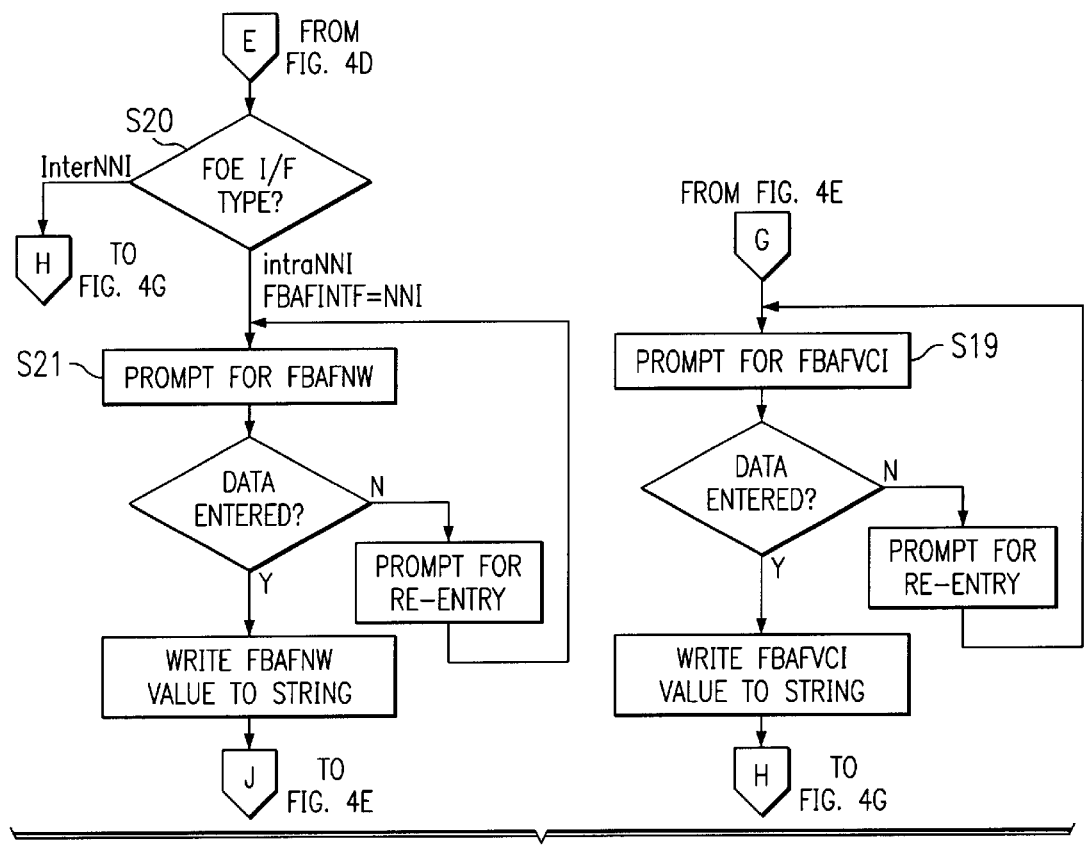

Referring to FIG. 4(F), if the user is creating a virtual channel connection, at S19 the user is prompted to enter FBAFVCI. From S14 (see FIG. 4(D)), control is passed to S20 where a determination is made, based on previously entered data, as to whether the from office equipment is an interNNI or an intraNNI with FBAFINTF=NNI. If FOE=intraNNI and FBAFINTF=NNI, at S21 the user is prompted to enter FBAFNW, and then control is passed to S17 shown in FIG. 4(E).

Figure 4G:
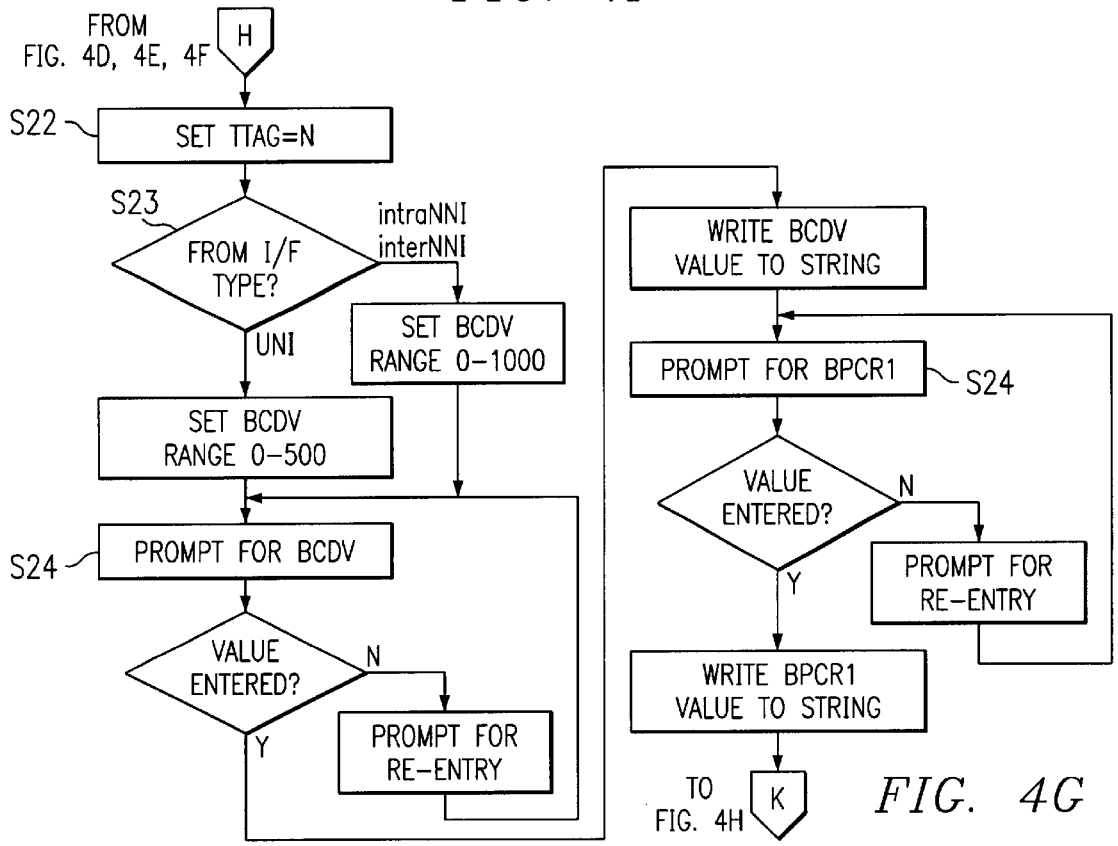

TTAG is set to "No" at S22 (see FIG. 4(G)), based on Traffic Descriptor 5 tagging requirements. As S23, the From side interface type is evaluated as being either a UNI or an NNI. At S24, the invention prompts the user to enter the BCDV traffic parameter, and the allowable values for this parameter depend on the FOE interface type. At S24, the user is prompted to enter the BPCR1 traffic parameter.

Figure 4H:
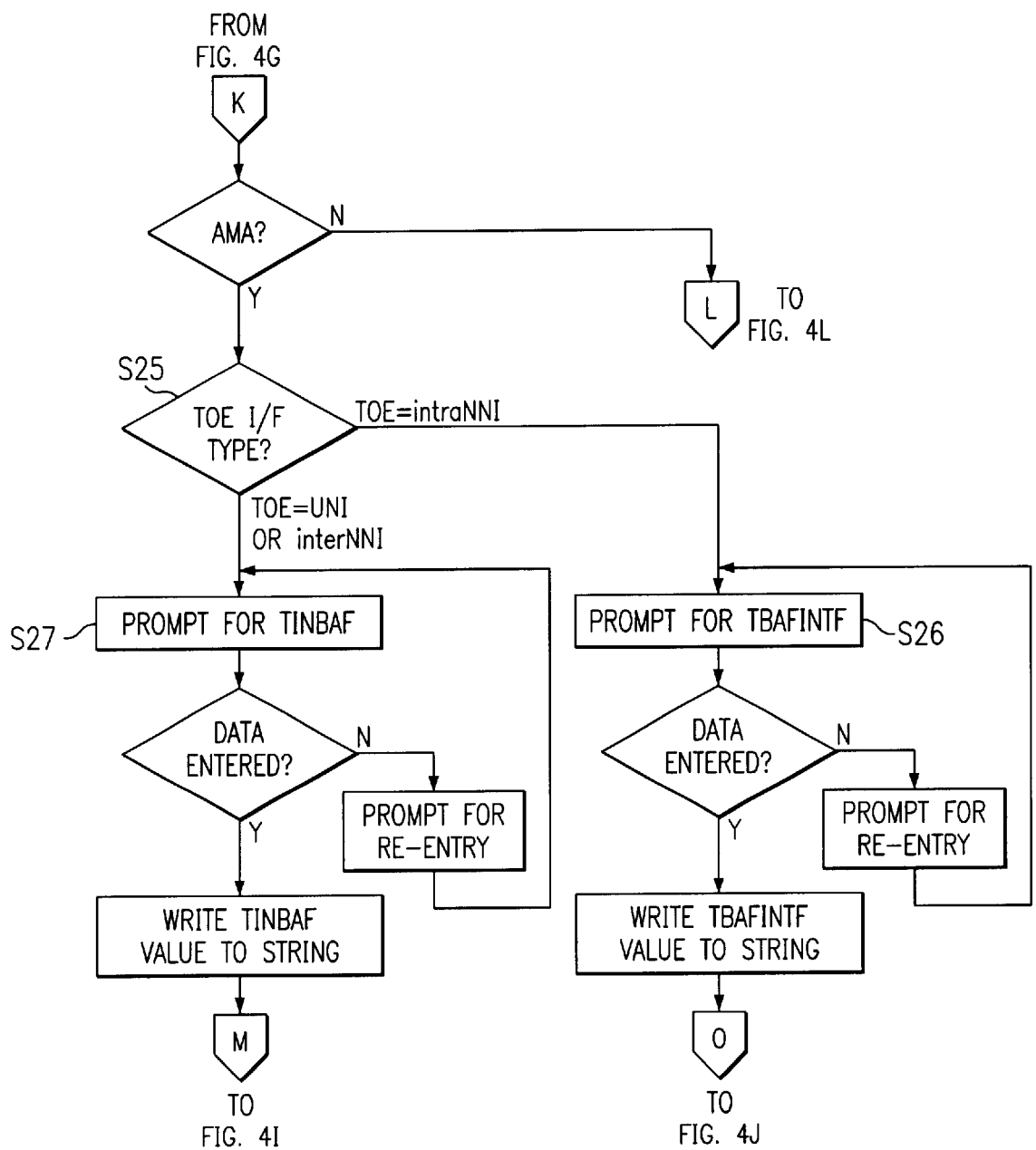

Referring to FIG. 4(H), at S25 it is determined, based on previously entered data, whether the To side interface is an intraNNI, or a UNI or interNNI. If TOE=intraNNI, at S26 the user is prompted to enter the TBAFINTF AMA parameter. If TOE=UNI or interNNI, at S27 the user is prompted to enter the TINBAF parameter.

Referring to FIG. 4(I), at S28, the user is prompted to enter the TEGBAF parameter. At S29, To side interface type is determined, based on previously entered data. If S29 determines that TOE=interNNI, S30 prompts the user to enter the TBAFNNI parameter.

Referring to FIG. 4(J), if S25 (FIG. 4(H)) determines that TOE=intraNNI, the invention is eventually routed to S31 to determine the setting for TBAFINTF, the interface type where the BAF record will be collected for the To side. If S31 determines that the User Resp is an NNI, S30 (FIG. 4(I)) prompts for TBAFNNI. If S31 determines that User Resp is UNI, S32 prompts for TBAFUNI and S33 prompts for TBAFVPI. Then, S34 determines whether the connection is a virtual path connection or a virtual channel connection based on previously entered data.

Referring to FIG. 4(K), if the connection is a virtual channel connection, S35 prompts for TBAFVCI. From S30 in FIG. 4(I), the invention proceeds eventually to S36 where it is determined, based on previously entered data, if TOE=interNNI or TOE=intraNNI and TBAFINTF=NNI. If TOE=intraNNI and TBAFINTF=NNI, S37 prompts the user for TBAFNW. Then, the user is prompted for TBAFVPI at S33 (FIG. 4(J)).

Referring to FIG. 4(L), at the point when the invention is routed to S38, the invention has determined it has enough information to generate the desired permanent virtual connection. At S38, the user is prompted to enter "Okay" to signify that his or her choices are those desired. At S39, a command string creating the permanent virtual connection is displayed in the command SYNTAX field of the interface.

The PVC generator of the invention can be used alone. However, some of the office data (the data given by the numerous parameters discussed herein) used by the PVC generator may be determined by other devices in the switching equipment. Therefore, it is possible to use the PVC generator with these other devices in a "stacked" configuration. In this manner, it would not be necessary to enter all office data. FIG. 5 shows the PVC generator used in such a stacked configuration. As can be seen, the PVC generator is used together with a virtual path generator to provide the PVC generator with the virtual path, an interface generator to provide interface data, a terminal generator, which deals the specific hardware card on the shelf and has functions including turning on the card. The terminal generator may provide the office equipment number, for example. FIG. 5 also shows the PVC generator being used with an equipment databank which would have information on the hardware. The stacked representation denotes that the upper elements need data from the lower elements. For example, the terminal generator must know information on the hardware with which the network is communicating, and the virtual path generator must know information from the terminal generator.

For compatibility with other systems, the invention may be implemented using the JAVA language. JAVA is an object oriented language which allows the user to create data as attributes of an object. Another program can inherit those attributes. JAVA is also platform independent and can be used with several different operating systems, including DS, Windows, UNIX and MacIntosh. Although JAVA is ideal, other languages can be used.

While the invention has been described in connection with the preferred embodiments, it will be understood that modifications within the principle outlined above will be evident to those skilled in the art. Thus, the invention is not limited to the preferred embodiments, but is intended to encompass such modifications.

What is claimed is:

1. A method for programming at least one telecommunications switch, comprising the steps of:

(a) using a graphical user interface, requesting the user to enter information regarding a permanent virtual connection desired to be created;

(b) determining, based on the information regarding the permanent virtual connection desired to be created, what items of data are necessary to generate the permanent virtal connection; and (c) using a graphical user interface having a plurality of fields corresonding respectively to the items of data, sequentially requesting, in a separate messages field, the user to enter the items of data determined to be necessary in step (b) such that the items of data requested from the user vary according to the information regarding the permanent virtual connection desired to be created.

2. A method for programming at least one telecommunications switch according to claim 1, wherein step (a) includes the substeps of:

requesting information as to whether a point-to-point connection or a point-to-multipoint connection is desired;

requesting information as to whether a virtual path connection or a virtual channel connection is desired;

requesting information as to a desired quality of service;

requesting information as to how billing data is to be collected; and requesting information as to a type of traffic to be handled by the permanent virtual connection.

3. A method for programming at least one telecommunications switch according to claim 1, further comprising the step of assembling the items of data in a form recognizable by a telecommunications switch.

4. A method for programming at least one telecommunications switch according to claim 3, wherein the items of data are partially assembled in a form recognizable by a telecommunications switch during steps (a) and (c), the method further comprising the step of displaying the partially assembled items of data during steps (a) and (c).

5. A method for programming at least one telecommunications switch according to claim 3, wherein the form recognizable by a telecommunications switch has positional parameters recognized by the telecommunications switch based on position, and key word parameters recognizable by the telecommunications switch based on an arrangement of characters and not based on position, the step of assembling the items of data including the substep of ordering both the positional parameters and the key word parameters in a predetermined order.

6. A method for programming at least one telecommunications switch according to claim 1, wherein the telecommunications switch has first and second ports, the method further comprising the steps of:

requesting the user to enter a range of virtual paths for the first port of the telecommunications switch, requesting the user to enter a beginning value for a range of virtual paths for the second port of the telecommunications switch;

automatically calculating an end value for the range of virtual paths for the second port of the switch, based on the range of virtual paths for the first port of the telecommunications switch; and for the ranges of virtual paths on the first and second ports of the telecommunications switch, simultaneously generating a plurality of permanent virtual connections.

7. A method for programming at least one telecommunications switch according to claim 1, wherein the telecommunications switch has first and second ports, the method further comprising the steps of:

requesting the user to enter a range of virtual channels for the first port of the telecommunications switch, requesting the user to enter a beginning value for a range of virtual channels for the second port of the telecommunications switch;

automatically calculating an end value for the range of virtual channels on the second port of the switch, based on the range of virtual channels for the first port of the telecommunications switch; and for the ranges of virtual channels on the first and second ports of the telecommunications switch, simultaneously generating a plurality of permanent virtual connections.

8. A telecommunications switch programming apparatus, comprising:

information request means for requesting the user to enter information regarding a permanent virtual connection desired to be created, using a graphical user interface;

means for determining, based on the information regarding the permanent virtual connection desired to be created, what items of data are necessary to generate the permanent virtual connection, the graphical user interface having a plurality of fields corresponding respectively to the items of data; and data request means, including a separate messages field in the graphical user interface to request the user to enter the items of data determined to be necessary, such that the items of data requested from the user vary according to the information regarding the permanent virtual connection desired to be created.

9. A telecommunications switch programming apparatus according to claim 8, wherein the information request means:

requests information as to whether a point-to-point connection or a point-to-multipoint connection is desired;

requests information as to whether a virtual path connection or a virtual channel connection is desired;

requests information as to a desired quality of service;

requests informaion as to how billing data is to be collected; and requests information as to a type of traffic to be handled by the permanent virtual connection.

10. A telecommunications switch programming apparatus according to claim 8, further comprising means for assembling the items of data in a form recognizable by a telecommunications switch.

11. A telecommunications switch programming apparatus according to claim 10, wherein the items of data are partially assembled in a form recognizable by a telecommunications switch, and the graphical user interface displays the partially assembled items of data while the information request means and data request means request the user.

12. A telecommunications switch programming apparatus according to claim 10, wherein the form recognizable by a telecommunications switch has positional parameters recognized by the telecommunications switch based on position, and key word parameters recognizable by the telecommunications switch based on an arrangement of characters, and the means for assembling the items of data orders both the positional parameters and the key word parameters in a predetermined order.

13. A telecommunications switch programming apparatus according to claim 8, wherein the telecommunications switch has first and second ports, the apparatus further comprising:

means for requesting the user to enter a range of virtual paths for the first port of the telecommunications switch, means for requesting the user to enter a beginning value for a range of virtual paths for the second port of the telecommunications switch;

means for automatically calculating an end value for the range of virtual paths for the second port of the telecommunications switch, based on the range of virtual paths for the first port of the switch; and means for simultaneously generating a plurality of permanent virtual connections for the ranges of virtual paths on the first and second ports of the telecommunications switch.

14. A telecommunications switch programming apparatus according to claim 8, wherein the telecommunications switch has first and second ports, the apparatus further comprising:

means for requesting the user to enter a range of virtual channels for the first port of the telecommunications switch, means for requesting the user to enter a beginning value for a range of virtual channels for the second port of the telecommunications switch;

means for automatically calculating an end value for the range of virtual channels for the second port of the telecommunications switch, based on the range of virtual channels for the first port of the switch; and means for simultaneously generating a plurality of permanent virtual connections for the ranges of virtual channels on the first and second ports of the telecommunications switch.

15. An apparatus for programming at least one telecommunications switch comprising:

a graphical user interface having a plurality of fields and operable to request a user to enter information regarding a permanent virtual connection desired to be created; and a private virtual circuit generator operable to determine what items of data are necessary to generate the permanent virtual connection based on the information regarding the permanent virtual connection desired to be created, and vary the fields associated with the graphical user interface to correspond respectively to the items of data and to sequentially request in separate fields the user to enter the items of data determined to be necessary.

16. The apparatus for programming at least one telecommunications switch according to claim 15, wherein the graphical user interface is further operable to:

request information as to whether a point-to-point connection or a point-to-multipoint connection is desired;

request information as to whether a virtual path connection or a virtual channel connection is desired;

request information as to a desired quality of service;

request information as to how billing data is to be collected; and request information as to a type of traffic to be handled by the permanent virtual connection.

17. The apparatus for programming at least one telecommunications switch according to claim 15, wherein the telecommunications switch has a first port and a second port;

wherein the graphical user interface is further operable to request the user to enter a range of virtual paths for the first port of the telecommunications switch and request the user to enter a beginning value for a range of virtual paths for the second port of the telecommunications switch; and wherein the private virtual circuit generator is further operable to automatically calculate an end value for the range of virtual paths for the second port of the switch, based on the range of virtual paths for the first port of the telecommunications switch and simultaneously generate a plurality of permanent virtual connections for the ranges of virtual paths on the first and second ports of the telecommunications switch.

18. The apparatus for programming at least one telecommunications switch according to claim 15, wherein the telecommunications switch has first and second ports;

wherein the graphical user interface is further operable to request the user to enter a range of virtual paths for the first port of the telecommunications switch and request the user to enter a beginning value for a range of virtual paths for the second port of the telecommunications switch; and wherein the private virtual circuit generator is further operable to automatically calculate an end value for the range of virtual paths for the second port of the switch, based on the range of virtual paths for the first port of the telecommunications switch and simultaneously generate a plurality of permanent virtual connections for the ranges of virtual paths on the first and second ports of the telecommunications switch.

19. The apparatus for programming at least one telecommunications switch according to claim 15, wherein the private virtual circuit generator is further operable to assemble the items of data in a form recognizable by a telecommunications switch and the graphical user interface is further operable to display the partially assembled items of data.

20. The apparatus for programming at least one telecommunications switch according to claim 19, wherein the form recognizable by a telecommunications switch comprises positional parameters recognized by the telecommunications switch based on position, and key word parameters recognizable by the telecommunications switch based on an arrangement of characters and not based on position, and wherein the private virtual circuit generator is further operable to order both the positional parameters and the key word parameters in a predetermined order.

* * * * *

UNITED STATES PATENT AND TRADEMARK OFFICE
CERTIFICATE OF CORRECTION

PATENT NO.     : 6,366,581 B1
DATED          : April 2, 2002
INVENTOR(S)    : Thomas C. Jespen It is certified that error appears in the above-identified patent and that said Letters Patent is hereby corrected as shown below:

<u>Title page,</u>
Item [56], U.S. PATENT DOCUMENTS, delete "5,280,576" and insert -- 5,280,476 --.
Delete "5,705,436" and insert -- 5,706,436 --.

<u>Column 1,</u>
Line 12, after "of" insert -- the --.
Line 29, after "carriers" delete "represents" and insert -- represent --.

<u>Column 4,</u>
Line 28, delete "made-up" and insert -- made up --.

<u>Column 7,</u>
Line 58, after "TBAFUNI:" delete "if" and insert -- If --.

<u>Column 8,</u>
Line 59, after "FOE=" delete "INTERNNI" and insert -- interNNI --.

<u>Column 11,</u>
Line 56, after "the" delete "from" and insert -- From --.

<u>Column 12,</u>
Line 65, after "including" delete "DS",

<u>Column 13,</u>
Line 16, delete "virtal" and insert -- virtual --.

Signed and Sealed this

Twenty-first Day of January, 2003

JAMES E. ROGAN
*Director of the United States Patent and Trademark Office*